United States Patent
Cheng

(10) Patent No.: US 11,882,509 B2
(45) Date of Patent: Jan. 23, 2024

(54) VIRTUAL KEY BINDING METHOD AND SYSTEM

(71) Applicants: GUANGZHOU CHENGXING ZHIDONG MOTORS TECHNOLOGY CO., LTD., Guangzhou (CN); GUANGZHOU XIAOPENG MOTORS TECHNOLOGY CO., LTD., Guangzhou (CN)

(72) Inventor: Ziyao Cheng, Guangzhou (CN)

(73) Assignees: GUANGZHOU CHENGXING ZHIDONG MOTORS TECHNOLOGY CO., LTD., Guangzhou (CN); GUANGZHOU XIAOPENG MOTORS TECHNOLOGY CO., LTD., Guangzhou (CN)

(*) Notice: Subject to any disclaimer, the term of this patent is extended or adjusted under 35 U.S.C. 154(b) by 354 days.

(21) Appl. No.: 17/133,230

(22) Filed: Dec. 23, 2020

(65) Prior Publication Data
US 2021/0120392 A1 Apr. 22, 2021

Related U.S. Application Data

(63) Continuation of application No. PCT/CN2019/093474, filed on Jun. 28, 2019.

(30) Foreign Application Priority Data

Mar. 12, 2019 (CN) .......................... 201910187024.5

(51) Int. Cl.
*H04W 4/80* (2018.01)
*H04W 4/48* (2018.01)
*H04L 9/32* (2006.01)

(52) U.S. Cl.
CPC ............. *H04W 4/80* (2018.02); *H04L 9/3249* (2013.01); *H04L 9/3252* (2013.01); *H04L 9/3263* (2013.01); *H04W 4/48* (2018.02)

(58) Field of Classification Search
CPC ......... H04W 4/80; H04W 4/48; H04W 12/71; H04W 12/041; H04W 12/48;
(Continued)

(56) References Cited

U.S. PATENT DOCUMENTS

2014/0079217 A1 3/2014 Bai
2018/0068505 A1* 3/2018 Mullett .................. H04W 4/80
(Continued)

FOREIGN PATENT DOCUMENTS

CN 103035054 A 4/2013
CN 103684786 A 3/2014
(Continued)

OTHER PUBLICATIONS

Supplementary European Search Report for the parallel application EP19918790.7.

*Primary Examiner* — Eugene Yun
(74) *Attorney, Agent, or Firm* — J.C. PATENTS

(57) ABSTRACT

The present disclosure relates to the technical field of vehicle, and discloses a virtual key binding method and system, including: when an input binding instruction is detected, a terminal device extracts a device fingerprint of the terminal device and generates a service key; and generates device feature information including the device fingerprint and the service key, and sends the device feature information to a service server, so as to enable the service server to store the device feature information in an on-board electronic device of a vehicle to be bound; and when it is detected that a binding result sent by the service server is a successful binding, the terminal device stores Bluetooth
(Continued)

information in the binding result, the Bluetooth information matching with the vehicle to be bound.

15 Claims, 11 Drawing Sheets

(58) Field of Classification Search
CPC ... H04L 9/3249; H04L 9/3252; H04L 9/3263; H04L 9/0819; H04L 9/3247; H04L 2209/805; H04L 2209/84; H04L 9/0866; H04L 67/12; B60R 25/24
USPC ............................................. 455/41.2
See application file for complete search history.

(56) References Cited

U.S. PATENT DOCUMENTS

2018/0257605 A1* 9/2018 Oberbeckmann ..... B60R 25/245
2019/0073671 A1* 3/2019 Fang ................ G06Q 20/38215

FOREIGN PATENT DOCUMENTS

| | | |
|---|---|---|
| CN | 104464040 A | 3/2015 |
| CN | 104540132 A | 4/2015 |
| CN | 104808608 A | 7/2015 |
| CN | 105015489 A | 11/2015 |
| CN | 105490996 A | 4/2016 |
| CN | 106553617 A | 4/2017 |
| CN | 106878008 A | 6/2017 |
| CN | 107685714 A | 2/2018 |
| CN | 108206996 A | 6/2018 |
| CN | 108569250 A | 9/2018 |
| CN | 207884646 U | 9/2018 |
| CN | 108665337 A | 10/2018 |
| CN | 109446787 A | 3/2019 |
| CN | 109448195 A | 3/2019 |
| DE | 102017202024 A1 | 8/2018 |
| WO | WO2014205803 A1 | 12/2014 |

* cited by examiner

VIRTUAL KEY BINDING METHOD AND SYSTEM

CROSS-REFERENCE TO RELATED APPLICATIONS

This application is a continuation of International Application No. PCT/CN2019/093474, filed on Jun. 28, 2019, which claims priority to Chinese Patent Application No. 201910187024.5, filed on Mar. 12, 2019, both of which are hereby incorporated by reference in their entireties.

TECHNICAL FIELD

The present disclosure relates to the technical field of vehicle, in particular to a virtual key binding method and system.

BACKGROUND

With the development and popularization of the Internet of Things, some automobile manufacturers choose to use a card type automobile key to replace a conventional physical key. At present, the card type automobile key needs to be bound with an automobile before being used, usually, a binding manner of the card type automobile key and the automobile is: when the card type automobile key is approaching the automobile, the card type automobile key may realize simple matching authentication with a terminal device on the automobile through a Bluetooth protocol stack, after the authentication is passed, the card type automobile key and the automobile may be determined to implement the binding.

However, in practice, currently it is found that data transmission existed in a binding process between the card type automobile key and an on-board electronic device completely depends on the Bluetooth protocol stack, since different Bluetooth protocol stacks corresponds to different security levels, and in the process of use, a Bluetooth protocol stack with lower security level may encounter problems such as channel hijacking or channel interference, etc., therefore, the above-mentioned binding manner of the card type automobile key and the automobile cannot guarantee security of transmitting data.

SUMMARY

Embodiments of the present disclosure disclose a virtual key binding method and system, which can improve security of data transmission in a binding process between an automobile key and an automobile.

A first aspect of the embodiments in the present disclosure discloses a virtual key binding method, the method including:
- extracting, by a terminal device, a device fingerprint of the terminal device, and generating a service key, when an input binding instruction is detected;
- generating, by the terminal device, device feature information including the device fingerprint and the service key;
- sending, by the terminal device, the device feature information to a service server, to enable the service server to store the device feature information in an on-board electronic device of a vehicle to be bound; and
- storing, by the terminal device, Bluetooth information in the binding result when it is detected that a binding result sent by the service server is a successful binding, the Bluetooth information matching with the vehicle to be bound.

As an optional implementation, in the first aspect of the embodiments in the present disclosure, the extracting, by the terminal device, the device fingerprint of the terminal device, and the generating the service key, when the input binding instruction is detected include:
- extracting, by the terminal device, a plurality of device fingerprint feature values of the terminal device when the input binding instruction is detected; and
- generating, by the terminal device, the device fingerprint of the terminal device according to the plurality of device fingerprint feature values, and generating the service key which is a service public-private key pair or a service symmetric key.

A second aspect of the embodiments in the present disclosure discloses another virtual key binding method, the method including:
- associating and storing, by the service server, a device fingerprint and a service key included in device feature information, user account information of a terminal device, and information of a vehicle to be bound matching with the user account information when receiving the device feature information sent by the terminal device, and sending the device feature information to a security server to enable the security server to perform signing and encrypting operation on the device feature information;
- sending, by the service server, the target device feature information to an on-board electronic device matching with the information of the vehicle to be bound when signed and encrypted target device feature information fed back by the security server is detected, so as to enable the on-board electronic device to store the target device feature information; and
- sending, by the service server, a binding result to the terminal device when receiving the binding result sent by the on-board electronic device.

As an optional implementation, in the second aspect of the embodiment in the present disclosure, the sending, by the service server, the binding result to the terminal device, when receiving the binding result sent by the on-board electronic device, includes:
- judging, by the service server, whether the binding result is a successful binding result when receiving the binding result sent by the on-board electronic device;
- if so, obtaining, by the service server, Bluetooth information included in the binding result, the Bluetooth information including at least a Bluetooth address and a Bluetooth name;
- associating and storing, by the service server, the Bluetooth information with the user account information, the information of the vehicle to be bound, the device fingerprint and the service key included in the device feature information, and sending the binding result to the terminal device.

A third aspect of the embodiments in the present disclosure discloses a virtual key binding method, the method including:
- performing, by a security server, signing and encrypting operations on device feature information, when receiving the device feature information sent by a service server, to obtain target device feature information; and
- sending, by the security server, the target device feature information to the service server.

As an optional implementation, in the third aspect of the embodiments in the present disclosure, the performing, by the security server, signing and encrypting operation on the device feature information, when receiving the device feature information sent by the service server, to obtain the target device feature information includes:

performing, by the security server, digital signature on the device feature information through a preset private key, when receiving the device feature information sent by the service server, to obtain signed device feature information; and performing, by the security server, symmetric encrypting operation on the signed device feature information through a preset symmetric key, to obtain the target device feature information.

A fourth aspect of the embodiments in the present disclosure discloses another virtual key binding method, the method including:

performing, by an on-board electronic device, decrypting and verifying operations on target device feature information through an in-vehicle security module, when the in-vehicle security module of the on-board electronic device receives the target device feature information sent by a service server, to obtain current device feature information;

storing, by the on-board electronic device, the current device feature information through a vehicle external Bluetooth module, and transmitting a storage result and Bluetooth information corresponding to the vehicle external Bluetooth module to the in-vehicle security module, where the Bluetooth information includes a Bluetooth address and a Bluetooth name of the vehicle external Bluetooth module; and generating, by the on-board electronic device, a binding result including the storage result and the Bluetooth information through the in-vehicle security module, and sending the binding result to the service server through the in-vehicle security module.

A fifth aspect of the embodiments in the present disclosure discloses a terminal device, including:

an extracting unit, configured to extract a device fingerprint of the terminal device and generate a service key when an input binding instruction is detected;

a generating unit, configured to generate device feature information including the device fingerprint and the service key;

a first sending unit, configured to send the device feature information to a service server; and a first storing unit, configured to store Bluetooth information in a binding result when it is detected that the binding result sent by the service server is a successful binding, the Bluetooth information matching with a vehicle to be bound.

As an optional implementation, in the fifth aspect of the embodiments in the present disclosure, the extracting unit includes:

an extracting subunit, configured to extract a plurality of device fingerprint feature values of the terminal device when the input binding instruction is detected; and a generating subunit, configured to generate the device fingerprint of the terminal device according to the plurality of device fingerprint feature values, and to generate the service key which is a service public-private key pair or a service symmetric key.

A sixth aspect of the embodiments in the present disclosure discloses a service server, including:

a second storing unit, configured to associate and store a device fingerprint and a service key included in device feature information, user account information of a terminal device, and information of a vehicle to be bound matching with the user account information when receiving the device feature information sent by the terminal device, and to send the device feature information to a security server;

a second sending unit, configured to send target device feature information to an on-board electronic device matching with the information of a vehicle to be bound when signed and encrypted target device feature information fed back by the security server is detected; and a third sending unit, configured to send a binding result to the terminal device when receiving the binding result sent by the on-board electronic device.

As an optional implementation, in the sixth aspect of the embodiments in the present disclosure, the third sending unit includes:

a judging subunit, configured to judge whether a binding result is a successful binding result when the binding result sent by the on-board electronic device is received;

an obtaining subunit, configured to obtain Bluetooth information included in the binding result when a judging result of the judging subunit is yes, the Bluetooth information including at least a Bluetooth address and a Bluetooth name; and a sending subunit, configured to associate and store the Bluetooth information with the user account information, the information of the vehicle to be bound, and the device fingerprint and the service key included in the device feature information, and to send the binding result to the terminal device.

A seventh aspect of the embodiments in the present disclosure discloses a security server, including:

a signing and encrypting unit, configured to perform signing and encrypting operations on device feature information, when receiving the device feature information sent by the service server, to obtain target device feature information; and a fourth sending unit, configured to send the target device feature information to the service server;

As an optional implementation, in the seventh aspect of the embodiments in the present disclosure, the signing and encrypting unit includes:

a signing subunit, configured to perform digital signature on the device feature information through a preset private key, signed when receiving the device feature information sent by the service server, to obtain signed device feature information; and an encrypting subunit, configured to perform symmetric encrypting operation on the signed device feature information through a preset symmetric key, to obtain the target device feature information.

The eighth aspect of the embodiments in the present disclosure discloses an on-board electronic device, including:

an decrypting unit, configured to perform decrypting and verifying operations on target device feature information through an in-vehicle security module, when the in-vehicle security module of the on-board electronic device receives the target device feature information sent by a service server, to obtain current device feature information;

a transmitting unit, configured to store the current device feature information through a vehicle external Bluetooth module, and transmit a storage result and Bluetooth information corresponding to the vehicle external Bluetooth module to the in-vehicle security module, where the Bluetooth information includes a Bluetooth address and a Bluetooth name of the vehicle external Bluetooth module; and a fourth sending unit, configured to generate a binding result including the storage result and the Bluetooth information through the in-vehicle security module, and send the binding result to the service server through the in-vehicle security module.

The ninth aspect of the embodiments in the present disclosure discloses a virtual key binding system, and the system including a terminal device, a service server, a security server and an on-board electronic device, where:

the terminal device is used to extract a device fingerprint of the terminal device and generate a service key when an input binding instruction is detected; and to generate device feature information including the device fingerprint and the service key; and to send the device feature information to the service server so as to enable the service server to store the device feature information to the on-board electronic device of a vehicle to be bound; and to store the Bluetooth information in the binding result when it is detected that a binding result sent by the service server is successful binding, the Bluetooth information matching with the vehicle to be bound;

the service server is used to associate and store the device fingerprint and the service key included in the device feature information, user account information of the terminal device, and information of the vehicle to be bound matching with the user account information when receiving the device feature information sent by the terminal device, and send the device feature information to the security server to enable the security server to perform signing and encrypting operation on the device feature information; and to send the target device feature information to the on-board electronic device matching with the information of the vehicle to be bound, when signed and encrypted target device feature information fed back by the security server is detected, so as to enable the on-board electronic device to store the target device feature information; and to send a binding result to the terminal device when receiving the binding result sent by the on-board electronic device;

the security server is used to perform signing and encrypting operations on the device feature information, when receiving the device feature information sent by the service server, to obtain target device feature information; and to send the target device feature information to the service server; and the on-board electronic device is used to perform decrypting and verifying operations on the target device feature information through an in-vehicle security module, when the in-vehicle security module of the on-board electronic device receives the target device feature information sent by the service server, to obtain current device feature information; and to store the current device feature information through a vehicle external Bluetooth module, and transmit a storage result and Bluetooth information corresponding to the vehicle external Bluetooth module to the in-vehicle security module; and to generate a binding result including the storage result and the Bluetooth information through the in-vehicle security module, and send the binding result to the service server through the in-vehicle security module; where, the Bluetooth information includes a Bluetooth address and a Bluetooth name of the vehicle external Bluetooth module.

The tenth aspect of the embodiments in the present disclosure discloses a vehicle including the on-board electronic device disclosed in the eighth aspect.

The eleventh aspect of the embodiments of the present disclosure discloses a computer readable storage medium, and the computer readable storage medium stores program code, where the program code includes instructions for performing part or all of the steps in any method of the first aspect, the second aspect, the third aspect, and the fourth aspect.

The twelfth aspect of the embodiments of the present disclosure discloses a computer program product, and the computer program product makes a computer perform part or all of steps in any method of the first aspect, the second aspect, the third aspect, and the fourth aspect, when the computer program product is running on the computer.

The thirteenth aspect of the embodiments of the present disclosure discloses an application publishing platform, and the application publishing platform is used to publish a computer program product. Where, when the computer program product is running on a computer, enabling the computer to perform part or all of steps in any method of the first aspect, the second aspect, the third aspect, and the fourth aspect.

Compared with the prior art, the embodiments of the present disclosure have the following beneficial effects:

in the embodiments of the present disclosure, when an input binding instruction is detected, a terminal device extracts a device fingerprint of the terminal device and generates a service key; the terminal device generates device feature information including the device fingerprint and the service key; the terminal device sends the device feature information to a service server, so as to enable the service server to store the device feature information to an on-board electronic device of a vehicle to be bound; and when it is detected that a binding result sent by the service server is successful binding, the terminal device stores the Bluetooth information in the binding result, the Bluetooth information matching with the vehicle to be bound. It can be seen that implementations of the embodiments of the present disclosure can send the device feature information generated according to the terminal device to the service server, and bind the device feature information to the on-board electronic device through the service server, so as to enable the binding between the terminal device and the on-board electronic device to be realized through the service server, avoiding data loss problem due to direct transmission of data between the terminal device and the on-board electronic device, thus improving security of transmitting data in a binding process between a terminal device and an on-board electronic device of the vehicle.

BRIEF DESCRIPTION OF DRAWINGS

In order to describe technical solutions in the embodiments of the present disclosure more clearly, drawings required in the embodiments will be briefly introduced described below. Obviously, the drawings described below are only some embodiments of the present disclosure. For persons of ordinary skill in the art, other drawings may be obtained according to these drawings without paying creative effort.

DESCRIPTION OF EMBODIMENTS

In the following, technical solutions in the embodiments of the present disclosure will be described clearly and completely in combination with the drawings in the embodiments of the present disclosure. Obviously, the described embodiments are only part of the embodiments of the present disclosure, not all the embodiments. Based on the embodiments of the present disclosure, all other embodiments obtained by persons of ordinary skill in the art without creative effort belong to the protection scope of the present disclosure.

It should be noted that the terms "including" and "having" in the embodiments and the drawings of the present disclosure and any variation thereof are intended to cover exclusive inclusion. For example, a process, a method, a system, a product or a device including a series of steps or units is not limited to the listed steps or units, but optionally may also include steps or units not listed, or optionally may also include other steps or units inherent to the process, the method, the product, or the device.

Embodiments of the present disclosure disclose a virtual key binding method and system, which can improve security of data transmission in a binding process between a terminal device and an on-board electronic device of the vehicle. Detailed descriptions are described below respectively.

Embodiment 1

Figure 1:
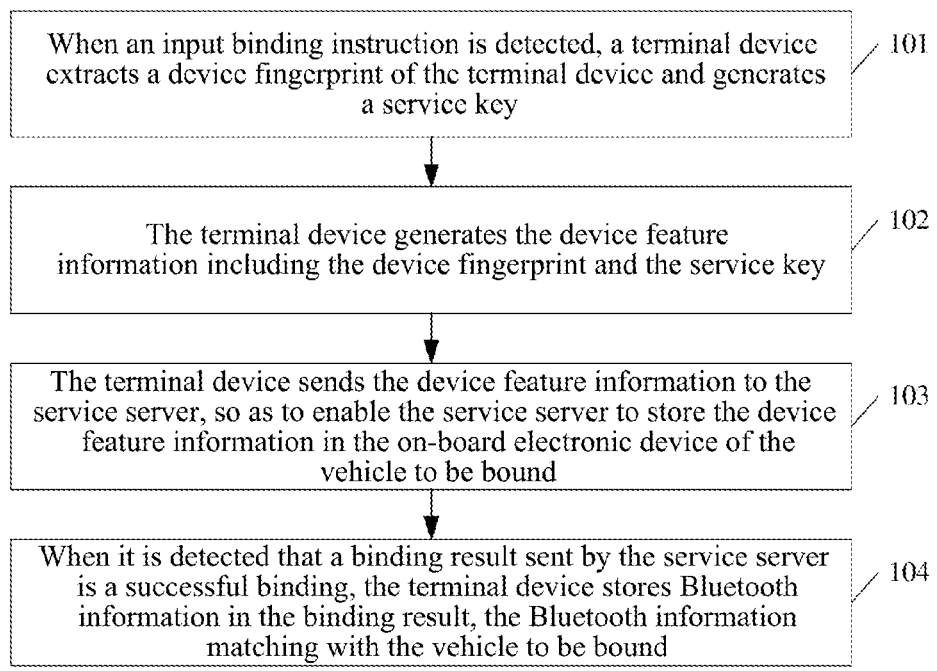
FIG. 1 is a flow diagram of a virtual key binding method disclosed by an embodiment in the present disclosure.

Please refer to FIG. 1, and FIG. 1 is a flow diagram of a virtual key binding method disclosed by an embodiment in the present disclosure. As shown in FIG. 1, the virtual key binding method may include the following steps:

101. When an input binding instruction is detected, a terminal device extracts a device fingerprint of the terminal device and generates a service key;

In the embodiment of the present disclosure, the terminal device may be a smart phone, a smart bracelet, and other devices; a user who inputs the binding instruction needs to be a car owner user, and cannot be a driver user. The car owner user may first send the binding instruction to the service server through the car owner's terminal device, and the service server may read the information of the vehicle to be bound and the information of a user to be bound included in the binding instruction, and when the service server identifies identity of the user to be bound as the car owner, the service server sends the binding instruction to the car owner's terminal device; when the service server identifies identity of the user to be bound as a driver, the service server reads the driver's account information from a memory and sends the binding instruction to the driver's account, so as to enable the terminal device that the driver logs in to receive the binding instruction, and then obtain device fingerprint and other information of the driver's terminal device.

In the embodiment of the present disclosure, the device fingerprint may be used to uniquely identify device features of the terminal device, thereby the terminal device may be uniquely determined according to the device fingerprint.

In the embodiment of the present disclosure, the service key may be a service public-private key pair or a service symmetric key, and the service key may enable the security server to perform signing and encrypting operation on the device feature information, so as to enable signed and encrypted device feature information based on the service key and stored in the on-board electronic device to be verified by a terminal device storing the service key.

Furthermore, the security server may perform digital signature on the device feature information. The digital signature is an application of asymmetric encryption technology and digital digest technology, which may be realized by an elliptic curve digital signature algorithm (ECDSA) or a RSA algorithm. The specific implementation may be that: the security server may perform calculations on the device feature information by using hash coding to obtain digital digest of the device feature information, and perform encryption on the digital digest obtained by the calculations by using a private key preset by the security server and the encryption algorithm to obtain the digital signature, and send the encrypted digital signature and the encrypted device feature information to the on-board electronic device at the same time. The on-board electronic device may pre-store a public key corresponding to the private key preset in the security server, and then the public key may be used to decrypt the received digital signature to obtain current digital digest. At the same time, the on-board electronic device may decrypt the encrypted device feature information to obtain current device feature information, and perform calculations on the current device feature information by using hash code similarly to obtain a test digital digest. If the test digital digest obtained by the calculations is the same as the current digital digest obtained by decryption, it may be considered that the on-board electronic device receiving the device feature information sent by the security server is accurate, and there is no loss or omission or other situations in the transmission process, ensuring accuracy of the device feature information received by the on-board electronic device.

102. The terminal device generates the device feature information including the device fingerprint and the service key.

103. The terminal device sends the device feature information to the service server, so as to enable the service server to store the device feature information in the on-board electronic device of the vehicle to be bound.

In the embodiment of the present disclosure, the service server may be a cloud server and other devices, and the service server may establish a communication connection with the terminal device, so as to perform data interaction with the terminal device, and process data uploaded by the terminal device, or establish a communication connection with the on-board electronic device, so as to perform data interaction with the on-board electronic device and process data uploaded by the on-board electronic device.

104. When it is detected that a binding result sent by the service server is a successful binding, the terminal device stores Bluetooth information in the binding result, the Bluetooth information matching with the vehicle to be bound.

In the embodiment of the present disclosure, since the terminal device and the on-board electronic device need to realize unlocking and other operations based on the method of Bluetooth pairing after successful binding, the terminal device needs to store Bluetooth information corresponding to Bluetooth key authentication module of the on-board electronic device, and the Bluetooth information may at least include a Bluetooth name and a Bluetooth address, etc., so as to enable the terminal device to matching the correct on-board electronic device preset on the vehicle according to the Bluetooth information.

As an optional implementation, the terminal device may also perform the following steps after performing step 104:
  when an input unbinding instruction is detected, the terminal device judges whether an unbound user type included in the unbinding instruction is a car owner type;
  if so, the terminal device identifies information of a vehicle to be unbound and unbound account information of an user to be unbound from the unbinding instruction;
  the terminal device generates unbinding request including the information of the vehicle to be unbound and the unbound account information, and sends the unbinding request to the service server;
  when receiving an unbound result sent by the service server, the terminal device outputs the unbound result.

Where, implementing the implementation may respond to the car owner user's application for unbinding, and send the information of the vehicle to be unbound included in the unbinding instruction and the unbinding account information of the user to be unbound to the service server, so as to enable the service server to accurately delete information corresponding to the unbinding instruction, and feed back result of the unbinding to the terminal device, so as to enable a user who initiates the unbinding application may clearly know the unbinding result, improving interaction between a terminal device and a user.

In the method described in FIG. 1, security of data transmission during a binding process between the terminal device and the vehicle's on-board electronic device can be improved. In addition, implementing the method described in FIG. 1 improves interaction between a terminal device and a user.

Embodiment 2

Figure 2:
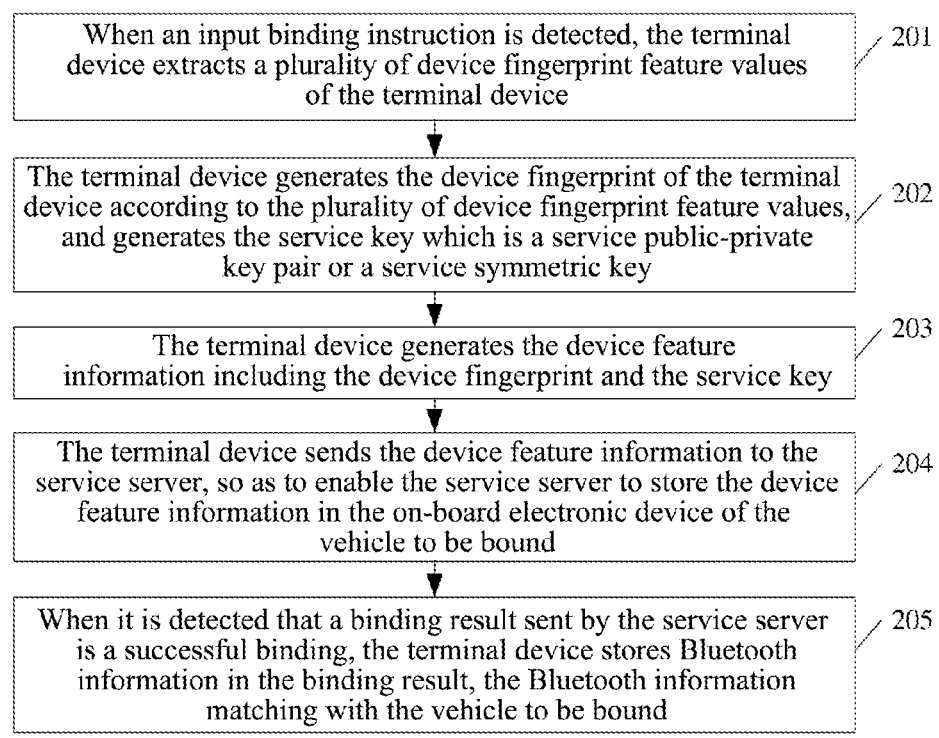
FIG. 2 is a flow diagram of another virtual key binding method disclosed by an embodiment in the present disclosure.

Please refer to FIG. 2, and FIG. 2 is a flow diagram of another virtual key binding method disclosed by an embodiment in the present disclosure. Compared with the embodiment 1, the embodiment of the present disclosure describes a generating method of a device fingerprint of a terminal device in more detail, making information related to the terminal device included in the device fingerprint more comprehensive. As shown in FIG. 2, the virtual key binding method may include the following steps:

201. When an input binding instruction is detected, the terminal device extracts a plurality of device fingerprint feature values of the terminal device.

In the embodiment of the present disclosure, the device fingerprint of the terminal device may be generated according to extracted device fingerprint feature values of the terminal device, the device fingerprint feature values may be a device model, a serial number, a hardware version and other information, and the device fingerprint of the terminal device may be generated by more than 200 device fingerprint feature values.

202. The terminal device generates the device fingerprint of the terminal device according to the plurality of device fingerprint feature values, and generates the service key which is a service public-private key pair or a service symmetric key.

In the embodiment of the present disclosure, the device fingerprint of the terminal device needs to be generated by combining the plurality of device fingerprint feature values, thus fingerprint feature information of the terminal device needs to include all device fingerprint feature values obtained.

In the embodiment of the present disclosure, implementing the above steps 201~202 may extract a plurality of device fingerprint feature values of the terminal device, and generate the device fingerprint according to the device fingerprint feature values, so as to enable information related to the terminal device to be included in the device fingerprint more comprehensive.

203. The terminal device generates the device feature information including the device fingerprint and the service key.

204. The terminal device sends the device feature information to the service server, so as to enable the service server may store the device feature information in the on-board electronic device of the vehicle to be bound.

205. When it is detected that a binding result sent by the service server is a successful binding, the terminal device stores Bluetooth information in the binding result, the Bluetooth information matching with the vehicle to be bound.

In the method described in FIG. 2, security of data transmission during a binding process between the terminal device and the vehicle's on-board electronic device may be improved. In addition, implementing the method described in FIG. 2 may enable the information related to the terminal device included in the device fingerprint to be more comprehensive.

Embodiment 3

Figure 3:
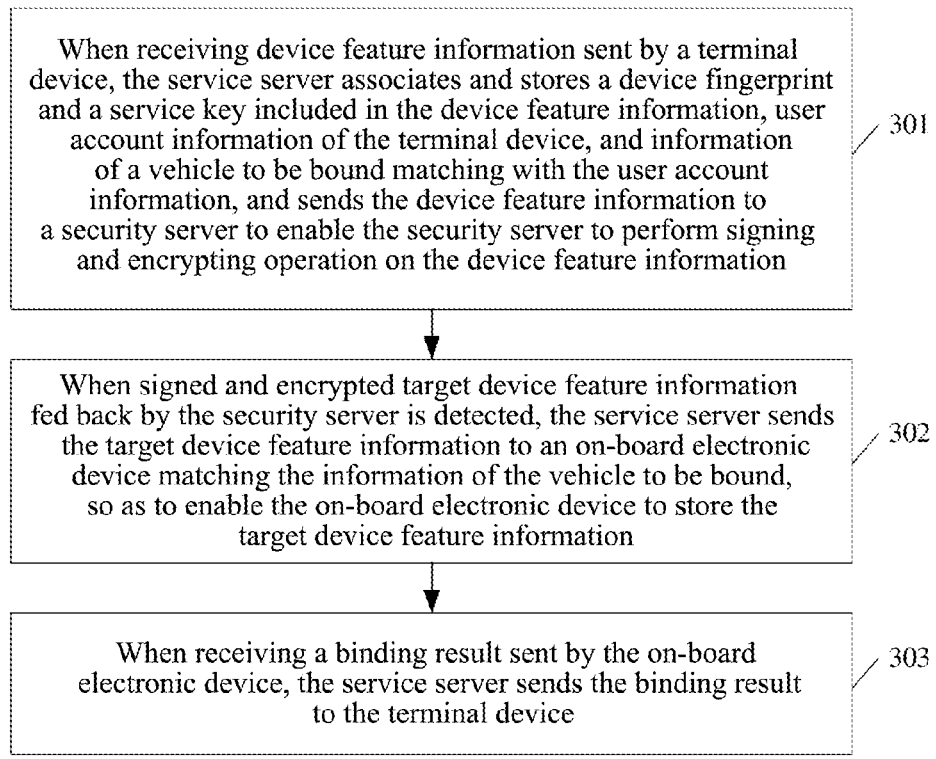
FIG. 3 is a flow diagram of another virtual key binding method disclosed by an embodiment in the present disclosure.

Please refer to FIG. 3, and FIG. 3 is a flow diagram of a virtual key binding method disclosed by an embodiment in the present disclosure. As shown in FIG. 3, the virtual key binding method may include the following steps:

301. When receiving device feature information sent by a terminal device, the service server associates and stores a device fingerprint and a service key included in the device feature information, user account information of the terminal device, and information of a vehicle to be bound matching with the user account information, and sends the device feature information to a security server to enable the security server to perform signing and encrypting operation on the device feature information.

In the embodiment of the present disclosure, the service server may be a cloud server and other devices, which may process data sent by the terminal device or an on-board electronic device, and may also store data uploaded by the terminal device or the on-board electronic device. The service server may establish data connection with the terminal device or the on-board electronic device in advance, so as to enable the terminal device and the on-board electronic device to send data to the service server at any time. In addition, the service server may also synchronize the device feature information to the security server; the security server may sign and encrypt the device feature information to ensure security of the device feature information.

In the embodiment of the present disclosure, user's account stored in the service server and the information of a vehicle to be bound matching with the user account information may be pre-stored by the user. For example, the user may register an account through a terminal device after buying a vehicle, and bind the registered account with vehicle identification number (VIN) of the user's vehicle, and the account registered by the user and the VIN bound to the account may be stored in a service server. When the user needs to bind a virtual key to the user's vehicle, the service server may directly determine user information of the terminal device and the information of the vehicle to be bound matching with the user's information from the pre-stored information, and the information of the vehicle to be bound may include VIN of the user's vehicle therein.

In the embodiment of the present disclosure, the service server may identify account information of a user sending the binding instruction in advance, and read out information of the vehicle to be bound to which the account information need to be bound from the binding instruction. The information of the vehicle to be bound may include VIN of the vehicle to be bound, and a target vehicle may be uniquely determined by the vehicle identification number. Account information of a user to be bound may include telephone number, number and other information of the user to be bound, which is not limited by the embodiment of the present disclosure. The service server may associate and store the device feature information, the user account information and the information of the vehicle to be bound into a memory of the service server, so as enable the service server to determine other information matching with any one of information from the memory according to the any one of the device feature information, the user account information and the information of the vehicle to be bound, so as to improve correlation among the device feature information, the user account information and the information of the vehicle to be bound. In addition, after storing the device feature information, the user account information and the information of the vehicle to be bound, the service server may synchronize the stored device feature information to the security server so as to enable the security server to perform signing and encrypting operations the device feature information, and so as to enable the device feature information sent by the service server to the on-board electronic device to be signed and encrypted information, thus improving security of data transmission between the service server and the on-board electronic device.

302. When signed and encrypted target device feature information fed back by the security server is detected, the service server sends the target device feature information to an on-board electronic device matching the information of the vehicle to be bound, so as to enable the on-board electronic device to store the target device feature information.

In the embodiment of the present disclosure, the service server may find a target vehicle matching with the information of the vehicle to be bound in the memory, and further determine information of the on-board electronic device set on the target vehicle, and the service server may send the target device feature information to the on-board electronic device matching with the information of the vehicle to be bound according to the obtained information of the on-board electronic device. The on-board electronic device may bind the target device feature information with a Bluetooth set on the vehicle, so as to enable the terminal device to connect with the Bluetooth set on the vehicle when the terminal device approaches the vehicle, and then authentication of the terminal device is realized based on the connected Bluetooth, so as to enable a user of the vehicle to realize unlocking authentication between the terminal device and the vehicle based on the Bluetooth.

303. When receiving a binding result sent by the on-board electronic device, the service server sends the binding result to the terminal device.

In the embodiment of the present disclosure, since the on-board electronic device has not established a communication connection with the terminal device in a binding stage, the on-board electronic device needs to send the binding result of the target device feature information and the on-board electronic device to the service server first, so as to enable the service server to send the binding result to the terminal device, and so as to enable the terminal device to get the binding result. In addition, the binding result may be a successful binding or an unsuccessful binding.

As an optional implementation, the service server may also perform the following steps after performing step 303:

When receiving an unbinding request sent by the terminal device, the service server identifies the information of a vehicle to be unbound and the unbinding account information included in the unbinding request;

The service server obtains feature information of a device to be unbound matching the information of the vehicle to be unbound and unbinding account information, and sends the feature information of the device to be unbound to the security server, so as to enable the security server to sign and encrypt the feature information of the device to be unbound, and the feature information of the device to be unbound may include a fingerprint of the device to be unbound and a service key, etc.;

When receiving signed and encrypted feature information of the device to be unbound sent by the security server, the service server sends the encrypted feature information of the device to be unbound to the on-board electronic device matching with the information of the vehicle to be unbound, so as to enable the on-board electronic device to delete bound information of the vehicle to be unbound;

When receiving an unbound result sent by the on-board electronic device, the service server sends the unbound result to the terminal device.

Where, implementing the implementation may enable the service server to obtain matched feature information of the device to be unbound according to the unbinding request, and send the encrypted feature information of the device to be unbound to the on-board electronic device after the security server has signed and encrypted, so as to enable the on-board electronic device to delete the feature information of the device to be unbound, so as to realize unbinding operation of the terminal device and the on-board electronic device, and send the unbinding result to the terminal device, so as to enable the user of the terminal device may know the unbinding result in time.

In the method described in FIG. 3, security of data transmission during a binding process between the terminal device and the vehicle's on-board electronic device can be improved. In addition, implementing the method described in FIG. 3, the user of the terminal device may know the unbinding result in time.

Embodiment 4

Figure 4:
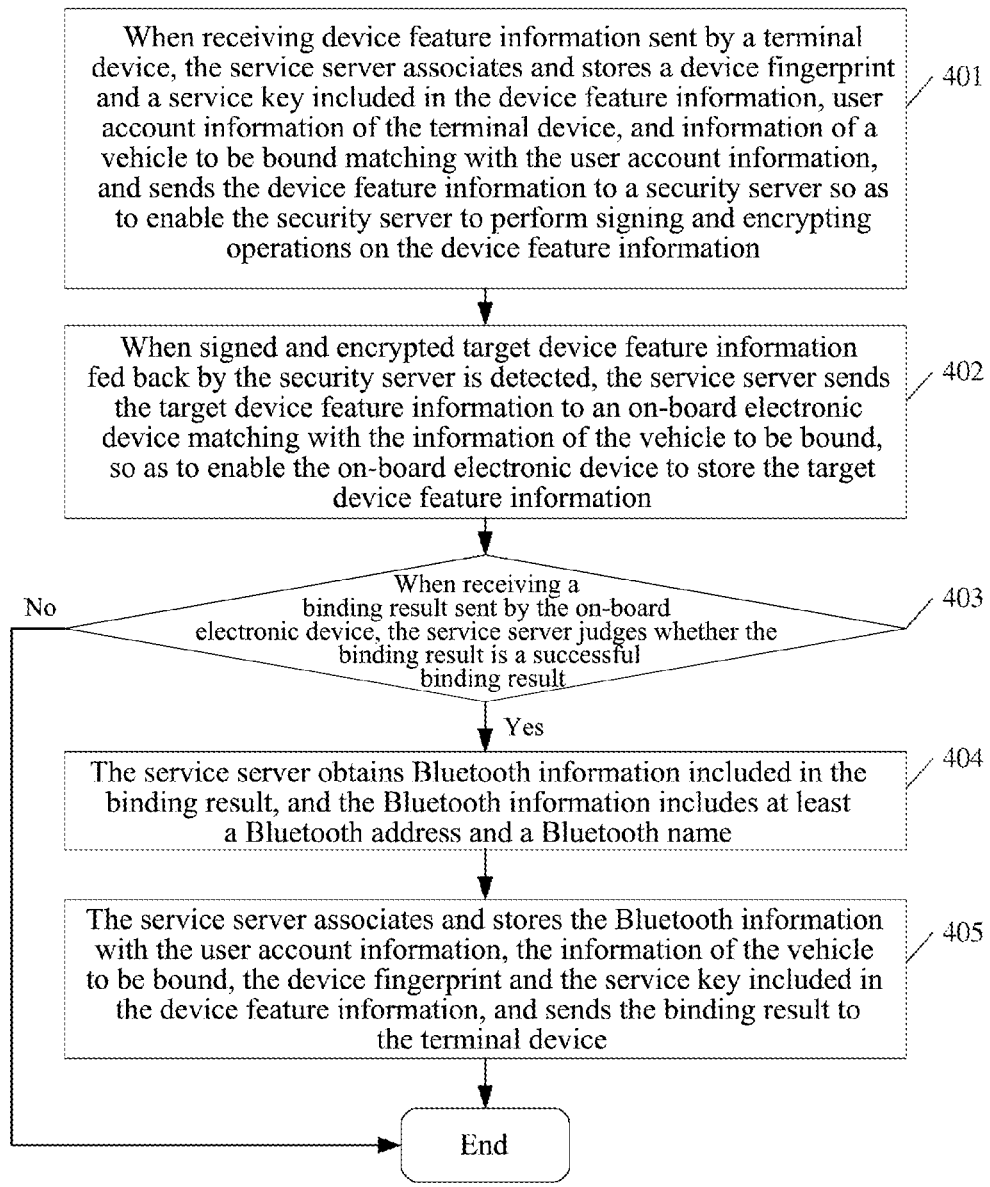
FIG. 4 is a flow diagram of another virtual key binding method disclosed by an embodiment in the present disclosure.

Please refer to FIG. 4, and FIG. 4 is a flow diagram of another virtual key binding method disclosed by an embodiment of the present disclosure. Compared with the embodiment 3, the embodiment of the present disclosure adds a method for binding Bluetooth information with device feature information, so as to ensure timeliness of information stored in a service server. As shown in FIG. 4, the virtual key binding method may include the following steps:

401. When receiving device feature information sent by a terminal device, the service server associates and stores a device fingerprint and a service key included in the device feature information, user account information of the terminal device, and information of a vehicle to be bound matching with the user account information, and sends the device feature information to a security server so as to enable the security server to perform signing and encrypting operation on the device feature information.

402. When signed and encrypted target device feature information fed back by the security server is detected, the service server sends the target device feature information to an on-board electronic device matching with the information of the vehicle to be bound, so as to enable the on-board electronic device to store the target device feature information.

403. When receiving a binding result sent by the on-board electronic device, the service server judges whether the binding result is a successful binding result. If so, perform steps 404~405; if not, end the present process.

In the embodiment of the present disclosure, when the binding result is judged to be a successful binding, it may be considered that the on-board electronic device has successfully stored the signed and encrypted device feature information, and the terminal device may successfully connect with the on-board electronic device through a Bluetooth, and may successfully unlock a vehicle with the on-board electronic device through the Bluetooth. When the binding result is judged to be an unsuccessful binding, it may be considered that the on-board electronic device has failed to successfully store the signed and encrypted device feature information, and the terminal device may not successfully unlock the vehicle with the on-board electronic device through a Bluetooth connection with the on-board electronic device. Therefore, the service server may send the signed and encrypted device feature information to the on-board electronic device again so as to enable the on-board electronic device to store the signed and encrypted device feature information again. In addition, the service server may also send binding failure information to the terminal device, so as to enable a user of the terminal device to perform a binding operation again, ensuring that the user of the terminal device may know the binding result of the terminal device and the on-board electronic device in time.

404. The service server obtains Bluetooth information included in the binding result, and the Bluetooth information includes at least a Bluetooth address and a Bluetooth name.

In the embodiment of the present disclosure, if the binding result is a successful binding result, it may be considered that the on-board electronic device has successfully stored the target device feature information into the on-board electronic device matching with the information of the vehicle to be bound, and since the terminal device and the on-board electronic device later need to be connected based on the Bluetooth, the on-board electronic device needs to transmit its own Bluetooth information to the terminal device, so as to enable the terminal device to successfully connect to a correct Bluetooth. The on-board electronic device may upload its own Bluetooth information (such as Bluetooth name and Bluetooth address, etc.) to the service server through the binding result, and transmit the Bluetooth information including the on-board electronic device to the terminal device through the service server.

405. The service server associates and stores the Bluetooth information with the user account information, the information of the vehicle to be bound, the device fingerprint and the service key included in the device feature information, and sends the binding result to the terminal device.

In the embodiment of the present disclosure, the service server may associate and store the Bluetooth information with corresponding device feature information, so as to enable the binding information of the terminal device and the on-board electronic device may be quickly and comprehensively obtained when modification, deletion and other operations is performed later on the binding information of the terminal device and the on-board electronic device, thus ensuring comprehensiveness of the modified or deleted binding information.

In the embodiment of the present disclosure, implementing the above-mentioned steps 403~405 may associates and stores the Bluetooth information fed back by the on-board electronic device with the device feature information, so as to enable the service server to associate and store information of the terminal device and the on-board electronic device which are in a binding relationship to the service server, ensuring the timeliness of the information stored in the service server.

In the method described in FIG. 4, security of data transmission during a binding process between the terminal device and the on-board electronic device of the vehicle may be improved. In addition, implementing the method described in FIG. 4 ensures the timeliness of the information stored in the service server.

Embodiment 5

Figure 5:
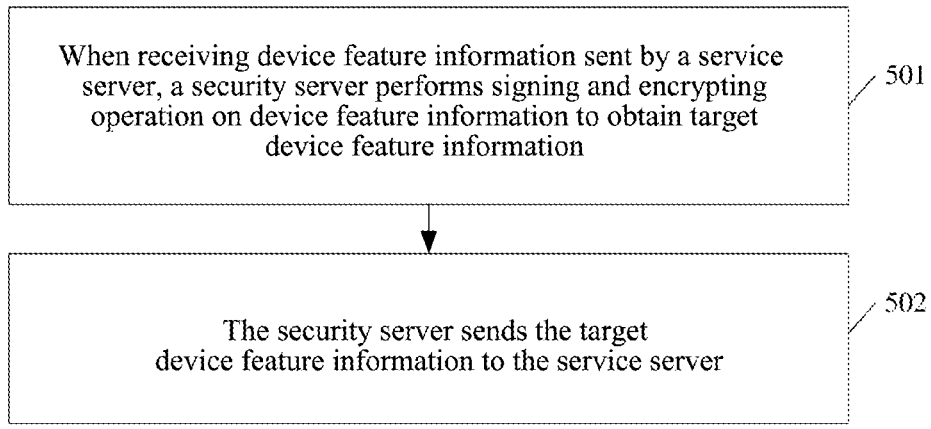
FIG. 5 is a flow diagram of another virtual key binding method disclosed by an embodiment in the present disclosure.

Please refer to FIG. 5, and FIG. 5 is a flow diagram of another virtual key binding method disclosed by an embodiment in the present disclosure. As shown in FIG. 5, the virtual key binding method may include the following steps:

501. When receiving device feature information sent by a service server, a security server performs signing and encrypting operation on device feature information to obtain target device feature information.

In the embodiment of the present disclosure, the security server may be a cloud server and other devices, which may receive data sent by the service server, and may also send data to the service server. The service server may synchronize the device feature information to the security server so as to enable the security server to operate on the device feature information. After the security server obtains the device feature information, the device feature information may be signed and encrypted. The security server may use the service key and RSA encryption algorithm to calculate asymmetric encryption signature of the device feature information, and encrypt the device feature information using advanced encryption standard (AES) to obtain signed and encrypted target device feature information. When the signed and encrypted device feature information obtained by using asymmetric encryption method is to be verified, a device that needs to be verified has a private key corresponding to a public key of asymmetric encryption. It can be seen that security of signed device feature information obtained by asymmetric encryption is guaranteed.

502. The security server sends the target device feature information to the service server.

As an optional implementation, the security server may also perform the following steps after performing step 502:

The security server performs signing and encrypting operations on the feature information of the device to be unbound to obtain encrypted feature information of the device to be unbound;

the security server sends the encrypted feature information of the device to be unbound to the service server.

Where, implementing the implementation may perform signing and encrypting operation on the feature information of the device to be unbound sent by the service server, so as to enable the service server to send the encrypted feature information of the device to be unbound to the on-board electronic device, ensuring security of transmission of the feature information of the device to be unbound between the service server and the on-board electronic device.

In the method described in FIG. 5, security of data transmission during a binding process between the terminal device and the on-board electronic device of the vehicle may be improved. In addition, implementing the method described in FIG. 5 ensures the security of the transmission of the feature information of the device to be unbound between the service server and the on-board electronic device.

Embodiment 6

Figure 6:
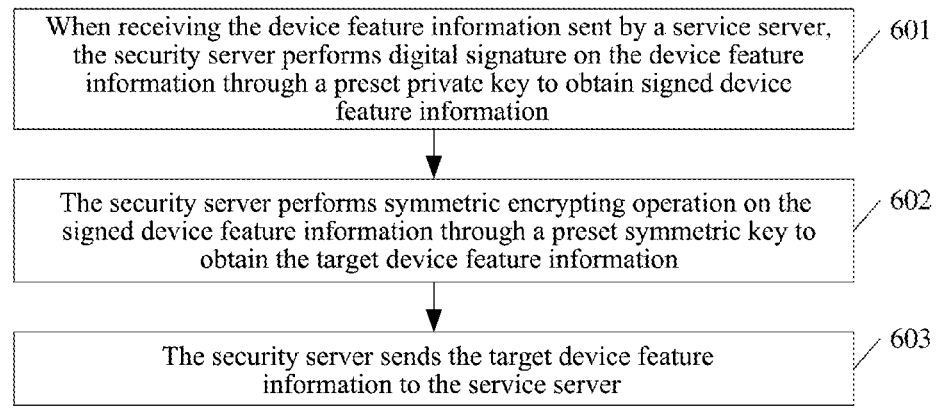
FIG. 6 is a flow diagram of another virtual key binding method disclosed by an embodiment in the present disclosure.

Please refer to FIG. 6, and FIG. 6 is a flow diagram of another virtual key binding method disclosed by the embodiment of the present disclosure. Compared with the embodiment 5, the embodiment of the present disclosure describes signing and encrypting operations on device feature information in more detail, ensuring security of data during a transmitting process. As shown in FIG. 6, the virtual key binding method may include the following steps:

601. When receiving the device feature information sent by the service server, the security server performs digital signature on the device feature information through a preset private key to obtain signed device feature information.

In the embodiment of the present disclosure, process of performing digital signature on the device feature information by the security server may be as follows: the security server may extract the digest of the device feature information, encrypt the extracted digest by using the preset private key, obtain digital signature, and send the digital signature and target device feature information to the on-board electronic device at the same time. The on-board electronic device is pre-stored with a public key corresponding to the private key preset by the security server, and the on-board electronic device may use the public key to decrypt received digital signature to obtain current digest. The on-board electronic device may compare the current digest with device feature information obtained by decryption. If the current digest is consistent with the device feature information, it may be considered that the device feature information obtained by decryption of the on-board electronic device is accurate, and there is no loss or omission in a transmitting process, thus ensuring accuracy of determining the device feature information by the on-board electronic device.

602. The security server performs symmetric encrypting operation on the signed device feature information through a preset symmetric key to obtain the target device feature information.

In the embodiment of the present disclosure, implementing the above steps 601~602, the device feature information may be subjected to digital signature first, and then the signed device feature information may be subjected to encryption operation to obtain encrypted target device feature information, so as to enable data transmitted with the on-board electronic device to be encrypted data, thus ensuring security of the data in the transmitting process.

603. The security server sends the target device feature information to the service server.

In the method described in FIG. 6, security of data transmission during a binding process between the terminal device and the vehicle's on-board electronic device can be improved. In addition, implementing the method described in FIG. 6 enables the data transmitted with the on-board electronic device to be encrypted data, thus ensuring the security of the data in the transmitting process.

Embodiment 7

Figure 7:
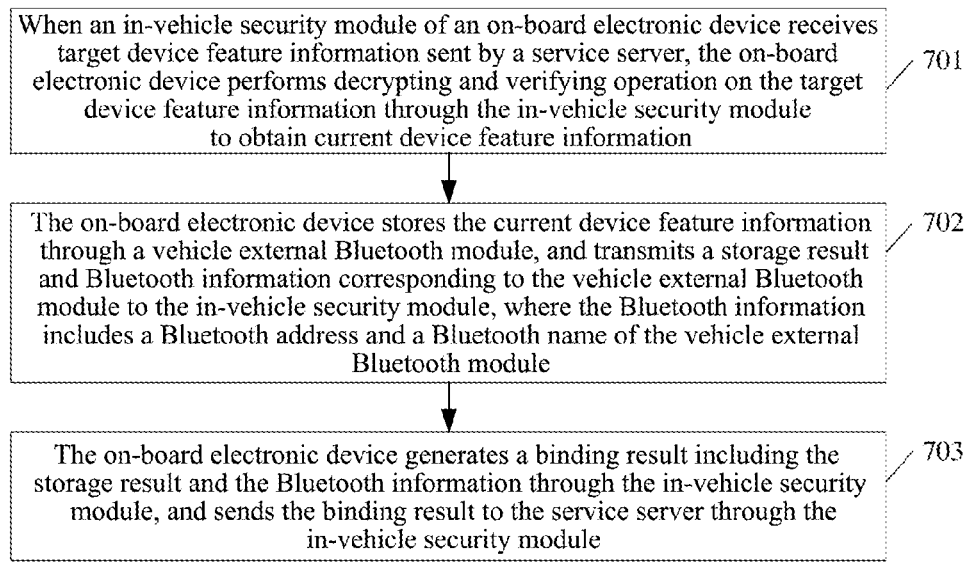
FIG. 7 is a flow diagram of another virtual key binding method disclosed by an embodiment in the present disclosure.

Please refer to FIG. 7, and FIG. 7 is a flow diagram of another virtual key binding method disclosed by an embodiment in the present disclosure. As shown in FIG. 7, the virtual key binding method may include the following steps:

701. When an in-vehicle security module of an on-board electronic device receives target device feature information sent by a service server, the on-board electronic device performs decrypting and verifying operation on the target device feature information through the in-vehicle security module to obtain current device feature information.

In the embodiment of the present disclosure, a software system such as an on-board system and so on may be set in the on-board electronic device, and the on-board electronic device may control any part of a vehicle, so as to facilitate operations of a vehicle user. The on-board electronic device may include a vehicle external Bluetooth module and an in-vehicle security module. The vehicle external Bluetooth module may realize Bluetooth connection with the terminal device, and may also store feature information of a target device sent by the service server, so as to enable the terminal device to be correctly connected with the on-board electronic device. The in-vehicle security module may perform decrypting and verifying operations on the feature information of the target device. Only when the in-vehicle security module successfully decrypts the target device feature information and verifies correctness and integrity of decrypted target device feature information, and only when the decrypting and verifying operations of the target device feature information are passed, can the current device feature information be obtained only.

702. The on-board electronic device stores the current device feature information through a vehicle external Bluetooth module, and transmits a storage result and Bluetooth information corresponding to the vehicle external Bluetooth module to the in-vehicle security module, where the Bluetooth information includes a Bluetooth address and a Bluetooth name of the vehicle external Bluetooth module.

In the embodiment of the present disclosure, the vehicle external Bluetooth module may be a Bluetooth module set outside the vehicle, and the vehicle external Bluetooth module may store the current device feature information. When the vehicle external Bluetooth module successfully stores the current device feature information, the vehicle external Bluetooth module may transmit Bluetooth information such as the Bluetooth name and the Bluetooth address and so on of the vehicle external Bluetooth module and a storage result to the in-vehicle security module.

703. The on-board electronic device generates a binding result including the storage result and the Bluetooth information through the in-vehicle security module, and sends the binding result to the service server through the in-vehicle security module.

As an optional implementation, the on-board electronic device may also perform the following steps after performing step 703:

when the in-vehicle security module of the on-board electronic device receives encrypted feature information of a device to be unbound sent by a service server, the on-board electronic device performs decrypting and verifying operations on the encrypted feature information of the device to be unbound through the in-vehicle security module to obtain feature information of a target device to be unbound;

the on-board electronic device deletes the feature information of the target device to be unbound through the vehicle external Bluetooth module, and transmits a deleting result to the in-vehicle security module;

The on-board electronic device determines that the deleting result is an unbinding result through the in-vehicle security module, and sends the unbinding result to the service server through the in-vehicle security module.

Where, implementing the implementation may find the stored feature information of the target device to be unbound according to the encrypted feature information of the device to be unbound sent by the service server, and delete the feature information of the target device to be unbound, so as to realize an unbinding operation of the terminal device and the on-board electronic device, thus improving accuracy of the unbinding operation.

In the method described in FIG. 7, security of data transmission during a binding process between the terminal device and the vehicle's on-board electronic device can be improved. In addition, implementing the method described in FIG. 7 improves the accuracy of the unbinding operation.

Embodiment 8

Figure 8:
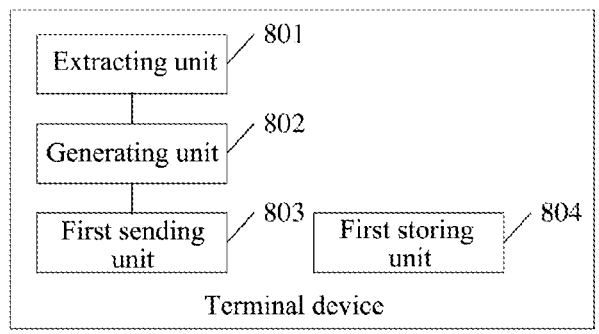
FIG. 8 is a schematic structure diagram of a terminal device disclosed by an embodiment in the present disclosure.

Please refer to FIG. 8, and FIG. 8 is a schematic structure diagram of a terminal device disclosed by an embodiment in the present disclosure, as shown in FIG. 8, the terminal device may include:

an extracting unit 801, configured to extract a device fingerprint of the terminal device and generate a service key when an input binding instruction is detected.

A generating unit 802, configured to generate device feature information including the device fingerprint extracted by the extracting unit 801 and the service key.

A first sending unit 803, configured to send the device feature information generated by the generating unit 802 to a service server.

A first storing unit 804, configured to store Bluetooth information in a binding result when it is detected that the binding result sent by the service server is a successful binding, the Bluetooth information matching with the a vehicle to be bound.

As an optional implementation, the first storing unit 804 may also be configured to:

judge whether an unbound user type included in an unbinding instruction is an car owner type when the input unbinding instruction is detected.

if so, identify information of a vehicle to be unbound and unbound account information of an user to be unbound from the unbinding information;

generate unbinding request including the information of the vehicle to be unbound and the unbound account information, and send the unbinding request to the service server;

when receiving an unbound result sent by the service server, output the unbound result.

Where, implementing the implementation may respond to the car owner user's application for unbinding, and send the information of the vehicle to be unbound included in the unbinding instructions and the binding account information of the user to be unbound to the service server, so as to enable the service server may accurately delete information corresponding to the unbinding instruction, and feed back result of the unbinding to the terminal device, so as to enable a user who initiates the unbinding application may clearly know the unbinding result, improving interaction between a terminal device and a user.

It can be seen that the implementation of the terminal device described in FIG. 8 can improve security of data transmission during a binding process between the terminal device and the on-board electronic device of the vehicle. In addition, implementing the terminal device described in FIG. 8 improves the interaction between the terminal device and the user.

Embodiment 9

Figure 9:
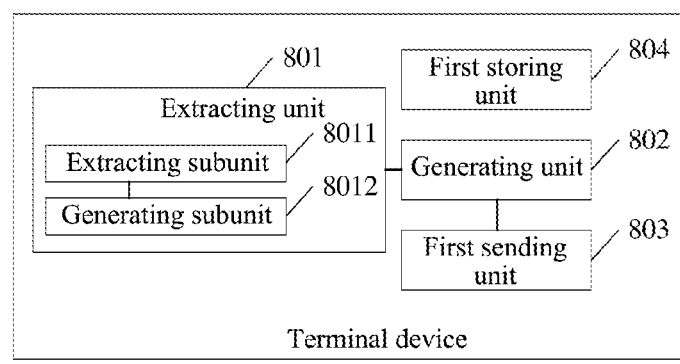
FIG. 9 is a schematic structure diagram of another terminal device disclosed by an embodiment in the present disclosure.

Please refer to FIG. 9, and FIG. 8 is a schematic structure diagram of another terminal device disclosed by an embodiment in the present disclosure. Where, a terminal device shown in FIG. 9 is optimized by the terminal device shown in FIG. 8. Compared with the terminal device shown in FIG. 8, the terminal device shown in FIG. 9 describes in more detail a generating method of a device fingerprint of the terminal device, which may enable information related to the terminal device included in the device fingerprint more comprehensive, and an extracting unit 801 of the terminal device shown in FIG. 9 may include:

an extracting subunit 8011, configured to extract a plurality of device fingerprint feature values of the terminal device when the input binding instruction is detected.

a generating subunit 8012, configured to generate the device fingerprint of the terminal device according to the plurality of device fingerprint feature values extracted by the extracting subunit 8011, and to generate the service key which is a service public-private key pair or a service symmetric key.

In the embodiment of the present disclosure, it is possible to extract a plurality of device fingerprint feature values of the terminal device, and generate the device fingerprint according to the plurality of device fingerprint feature values, so as to enable information related to the terminal device to be included in the device fingerprint more comprehensive.

It can be seen that, implementing the terminal device described in FIG. 9 can improve security of data transmission during a binding process between the terminal device and the vehicle's on-board electronic device. In addition, implementing the terminal device described in FIG. 9 may enable the information related to the terminal device included in the device fingerprint to be more comprehensive.

Embodiment 10

Figure 10:
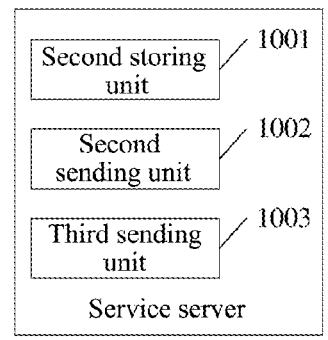
FIG. 10 is a schematic structure diagram of a service server disclosed by an embodiment in the present disclosure.

Please refer to FIG. 10, and FIG. 10 is a schematic structure diagram of a service server disclosed by an embodiment in the present disclosure, as shown in FIG. 10, the service server may include:

a second storing unit 1001, configured to associate and store a device fingerprint and a service key included in device feature information, user account information of a terminal device, and information of a vehicle to be bound matching with the user account information when receiving the device feature information sent by the terminal device, and to send the device feature information to a security server.

A second sending unit 1002, configured to send target device feature information to an on-board electronic device matching with the information of a vehicle to be bound when signed and encrypted target device feature information fed back by the security server is detected.

A third sending unit 1003, configured to send a binding result to the terminal device when receiving the binding result sent by the on-board electronic device.

As an optional implementation, the third sending unit 1003 may also be configured to:

identify the information of a vehicle to be unbound and the unbinding account information included in an unbinding request when receiving the unbinding request sent by the terminal device;

obtain feature information of a device to be unbound matching with the information of the vehicle to be unbound and the unbinding account information, and send the feature information of the device to be unbound to the security server, so as to enable the security server to sign and encrypt the feature information of the device to be unbound, and the feature information of the device to be unbound may include a fingerprint of the device to be unbound and a service key, etc;

send the encrypted feature information of the device to be unbound to the on-board electronic device matching the information of the vehicle to be unbound when receiving the encrypted feature information of the device to be unbound, being signed and encrypted, sent by the security server, so as to enable the on-board electronic device to delete the information of the bound vehicle to be unbound;

send an unbound result to the terminal device when receiving the unbound result sent by the on-board electronic device.

Where, implementing the implementation may enable the service server to obtain matched feature information of the device to be unbound according to the unbinding request, and send the encrypted feature information of the device to be unbound to the on-board electronic device after the security server has signed and encrypted, so as to enable the on-board electronic device to delete the feature information of the device to be unbound, so as to realize unbinding operation of the terminal device and the on-board electronic device, and send the unbinding result to the terminal device, so as to enable the user of the terminal device to know the unbinding result in time.

It can be seen that implementing the service server described in FIG. 10 can improve security of data transmission during a binding process between the terminal device and the vehicle's on-board electronic device. In addition, implementing the service server described in FIG. 10 may enable the user of the terminal device to know the unbinding result in time.

Embodiment 11

Figure 11:
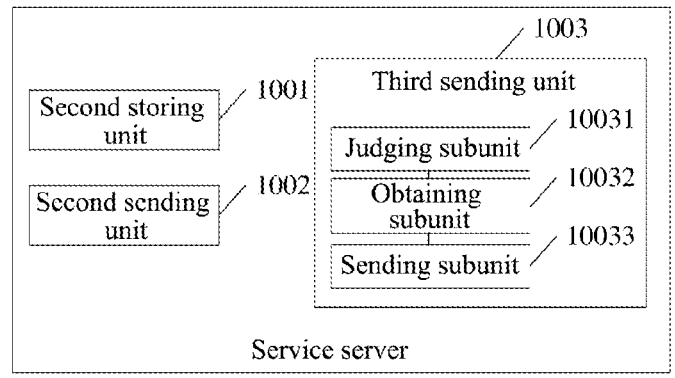
FIG. 11 is a schematic structure diagram of another service server disclosed by an embodiment of the present disclosure.

Please refer to FIG. 11, and FIG. 11 is a schematic structure diagram of another service server disclosed by an embodiment of the present disclosure. Where, the service server shown in FIG. 11 is optimized by the service server shown in FIG. 10. Compared with the service server shown in FIG. 10, the service server shown in FIG. 11 adds a method for binding Bluetooth information with device feature information to ensure timeliness of information stored in the service server, and a third sending unit 1003 of the service server shown in FIG. 11 may include:

a judging subunit 10031, configured to judge whether the binding result is a successful binding result when the binding result sent by the on-board electronic device is received.

an obtaining subunit 10032, configured to obtain Bluetooth information included in the binding result when a judging result of the judging subunit 10031 is yes, the Bluetooth information including at least a Bluetooth address and a Bluetooth name;

a sending subunit 10033, configured to associate and store the Bluetooth information obtained by the obtaining subunit 10032 with the user account information, the information of the vehicle to be bound, and the device fingerprint and the service key included in the device feature information, and to send the binding result to the terminal device.

In the embodiment of the present disclosure, it is possible to associate and store the Bluetooth information fed back by the on-board electronic device with the device feature information, so as to enable the service server to associate and store information of the terminal device and the on-board electronic device which are in a binding relationship to the service server, ensuring the timeliness of the information stored in the service server.

It may be seen that implementing the service server described in FIG. 11 may improve security of data transmission during a binding process between the terminal device and the on-board electronic device. In addition, implementing the service server described in FIG. 11 ensures the timeliness of the information stored in the service server.

Embodiment 12

Figure 12:
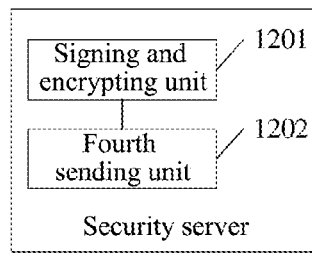
FIG. 12 is a schematic structure diagram of a security server disclosed by an embodiment in the present disclosure.

Please refer to FIG. 12, and FIG. 12 is a schematic structure diagram of a security server disclosed by an embodiment in the present disclosure, as shown in FIG. 12, the security server may include:

a signing and encrypting unit 1201, configured to perform signing and encrypting operation on the device feature information, when receiving device feature information sent by the service server, to obtain target device feature information.

A fourth sending unit 1202, configured to send the target device feature information obtained by the signing and encrypting unit 1201 to the service server.

As an optional implementation, the fourth sending unit 1202 may also be configured to:

perform signing and encrypting operations on the feature information of the device to be unbound to obtain encrypted feature information of the device to be unbound;

send the encrypted feature information of the device to be unbound to the service server.

Where, implementing the implementation may perform signing and encrypting operation on the feature information of the device to be unbound sent by the service server, so as to enable the service server sends the encrypted feature information of the device to be unbound to the on-board electronic device, ensuring security of transmission of the feature information of the device to be unbound between the service server and the on-board electronic device.

It can be seen that implementing the security server described in FIG. 12 can improve the security of data transmission during a binding process between the terminal device and the vehicle's on-board electronic device. In addition, implementing the security server described in FIG. 12 ensures security of transmitting the feature information of the device to be unbound between the service server and the on-board electronic device.

Embodiment 13

Figure 13:
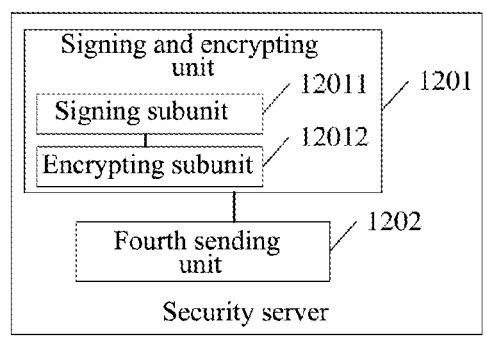
FIG. 13 is a schematic structure diagram of another security server disclosed by an embodiment in the present disclosure.

Please refer to FIG. 13, and FIG. 13 is a schematic structure diagram of another security server disclosed by an embodiment in the present disclosure. Where, the security server shown in FIG. 13 is optimized by the security server shown in FIG. 12. Compared with the security server shown in FIG. 12, the security server shown in FIG. 13 describes in more detail signing and encrypting operations for device feature information, ensuring security of data in a transmitting process, and a signing and encrypting unit 1201 of the security server shown in FIG. 13 may include:

a signing subunit 12011, configured to perform digital signature on the device feature information through a preset private key, signed when receiving the device feature information sent by the service server, to obtain signed device feature information.

An encrypting subunit 12012, configured to perform symmetric encrypting operation on the signed device feature information obtained by the signing subunit 12011 through a preset symmetric key to obtain the target device feature information.

In the embodiment of the present disclosure, the device feature information may be subjected to digital signature first, and then the signed device feature information may be subjected to encryption operation to obtain encrypted target device feature information, so as to enable data transmitted with the on-board electronic device to be encrypted data, thus ensuring security of the data in the transmitting process.

It can be seen that implementing the security server described in FIG. 13 can improve security of data transmission during a binding process between the terminal device and the vehicle's on-board electronic device. In addition, implementing the security server described in FIG. 13 enables the data transmitted with the on-board electronic device to be encrypted data, thus ensuring the security of the data in the transmitting process.

Embodiment 14

Figure 14:
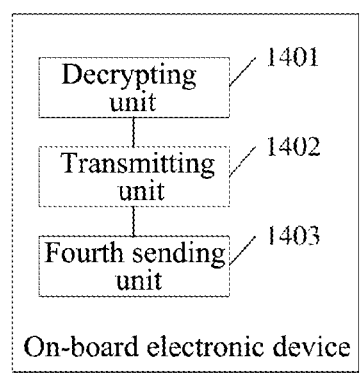
FIG. 14 is a schematic structure diagram of an on-board electronic device disclosed by an embodiment in the present disclosure.

Please refer to FIG. 14, and FIG. 14 is a schematic structure diagram of an on-board electronic device disclosed by an embodiment in the present disclosure, as shown in FIG. 14, the on-board electronic device may include:

a decrypting unit 1401, configured to perform decrypting and verifying operation on target device feature information through an in-vehicle security module, when the in-vehicle security module of the on-board electronic device receives the target device feature information sent by a service server, to obtain current device feature information.

a transmitting unit 1402, configured to store the current device feature information obtained by the decrypting unit 1401 through a vehicle external Bluetooth module, and transmit a storage result and Bluetooth information corresponding to the vehicle external Bluetooth module to the in-vehicle security module, where the Bluetooth information includes a Bluetooth address and a Bluetooth name of the vehicle external Bluetooth module.

a fourth sending unit 1403, configured to generate a binding result including the storage result transmitted by the transmitting unit 1402 and the Bluetooth information through the in-vehicle security module, and send the binding result to the service server through the in-vehicle security module.

As an optional implementation, the fourth sending unit 1403 may also be configured to:

perform decrypting and verifying operations on encrypted feature information of a device to be unbound through the in-vehicle security module, when the in-vehicle security module of the on-board electronic device receives the encrypted feature information of the device to be unbound sent by the service server, to obtain feature information of a target device to be unbound;

delete the feature information of the target device to be unbound through the vehicle external Bluetooth module, and transmit a deleting result to the in-vehicle security module;

determine that the deleting result is an unbinding result through the in-vehicle security module, and send the unbinding result to the service server through the in-vehicle security module.

Where, implementing the implementation may find the stored feature information of the target device to be unbound according to the encrypted feature information of the device to be unbound sent by the service server, and delete the feature information of the target device to be unbound, so as to realize an unbinding operation of the terminal device and the on-board electronic device, thus improving accuracy of the unbinding operation.

It can be seen that implementing the on-board electronic device described in FIG. 14 can improve security of data transmission during a binding process between the terminal device and the vehicle's on-board electronic device. In addition, implementing the on-board electronic device described in FIG. 14 improves the accuracy of the unbinding operation.

Embodiment 15

Figure 15:
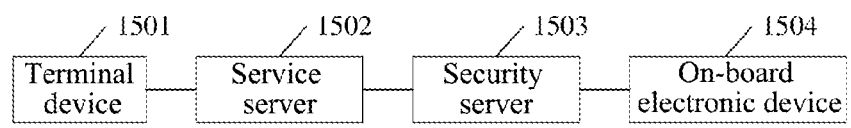
FIG. 15 is a schematic structure diagram of a virtual key binding system disclosed by an embodiment in the present disclosure.

Please refer to FIG. 15, and FIG. 15 is a schematic structure diagram of a virtual key binding system disclosed by an embodiment in the present disclosure. As shown in FIG. 15, the virtual key binding system may include: a terminal device 1501, a service server 1502, a security server 1503, and an on-board electronic device 1504. Where, in the embodiment of the present disclosure, structure and function of the terminal device 1501 are the same as those of any kind of terminal devices described in the previous embodiment 8 and embodiment 9, which are not repeated in the embodiment of the present disclosure. Structure and function of the service server 1502 are the same as those of any service servers described in the previous embodiment 10 and embodiment 11, which are not repeated in the embodiment of the present disclosure, neither. Structure and function of the security server 1503 are the same as those of any kind of security servers described in the previous embodiment 12 and embodiment 13, which are not repeated in the embodiment of the present disclosure, neither. Structure and function of the on-board electronic device 1504 are the same as those of the on-board electronic device described in the previous embodiment 14, which are not repeated in the embodiment of the present disclosure, neither.

Embodiment 16

Figure 16A:
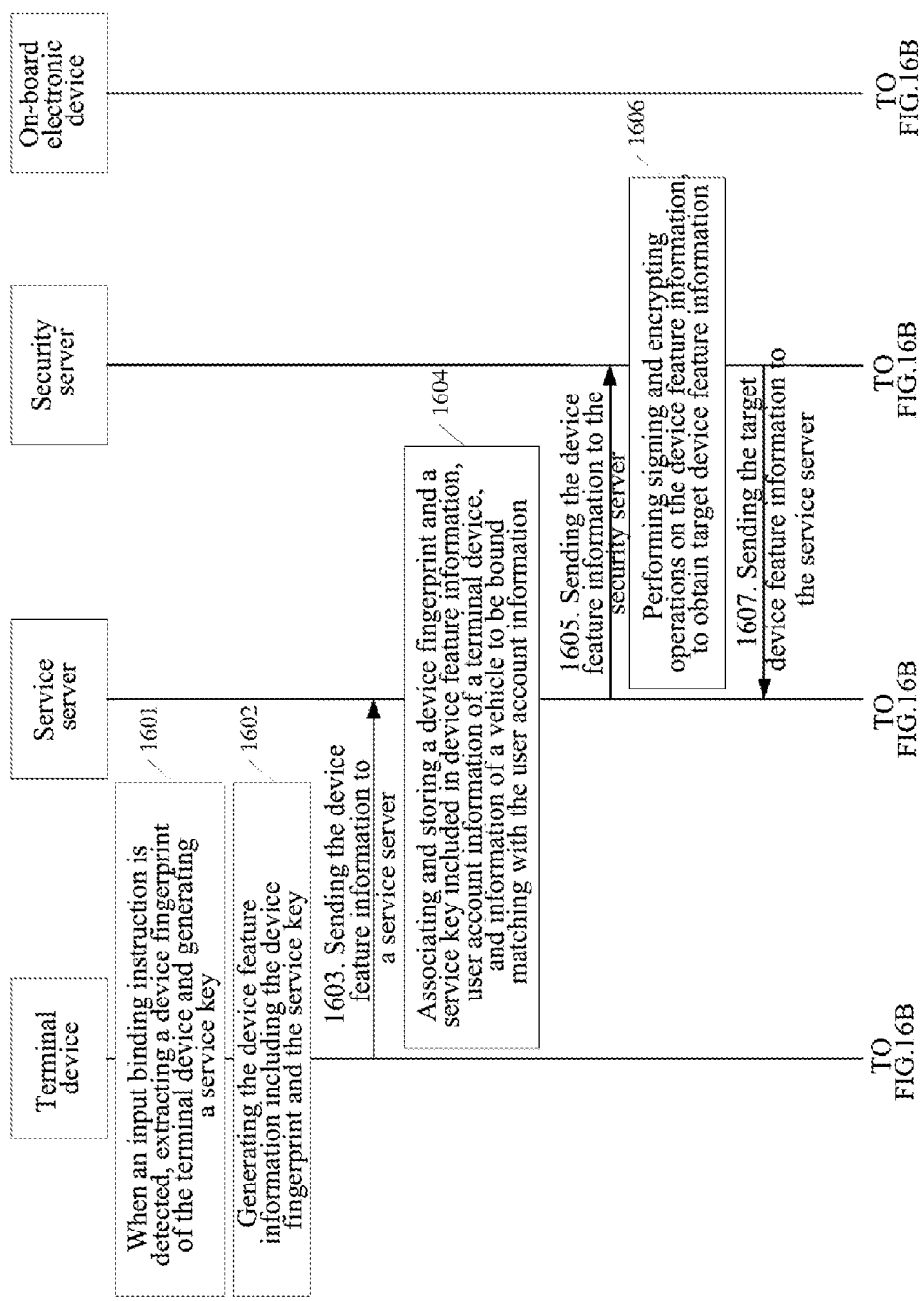
FIG. 16A is a flow diagram of another virtual key binding method disclosed by the embodiment in the present disclosure.
Figure 16B:
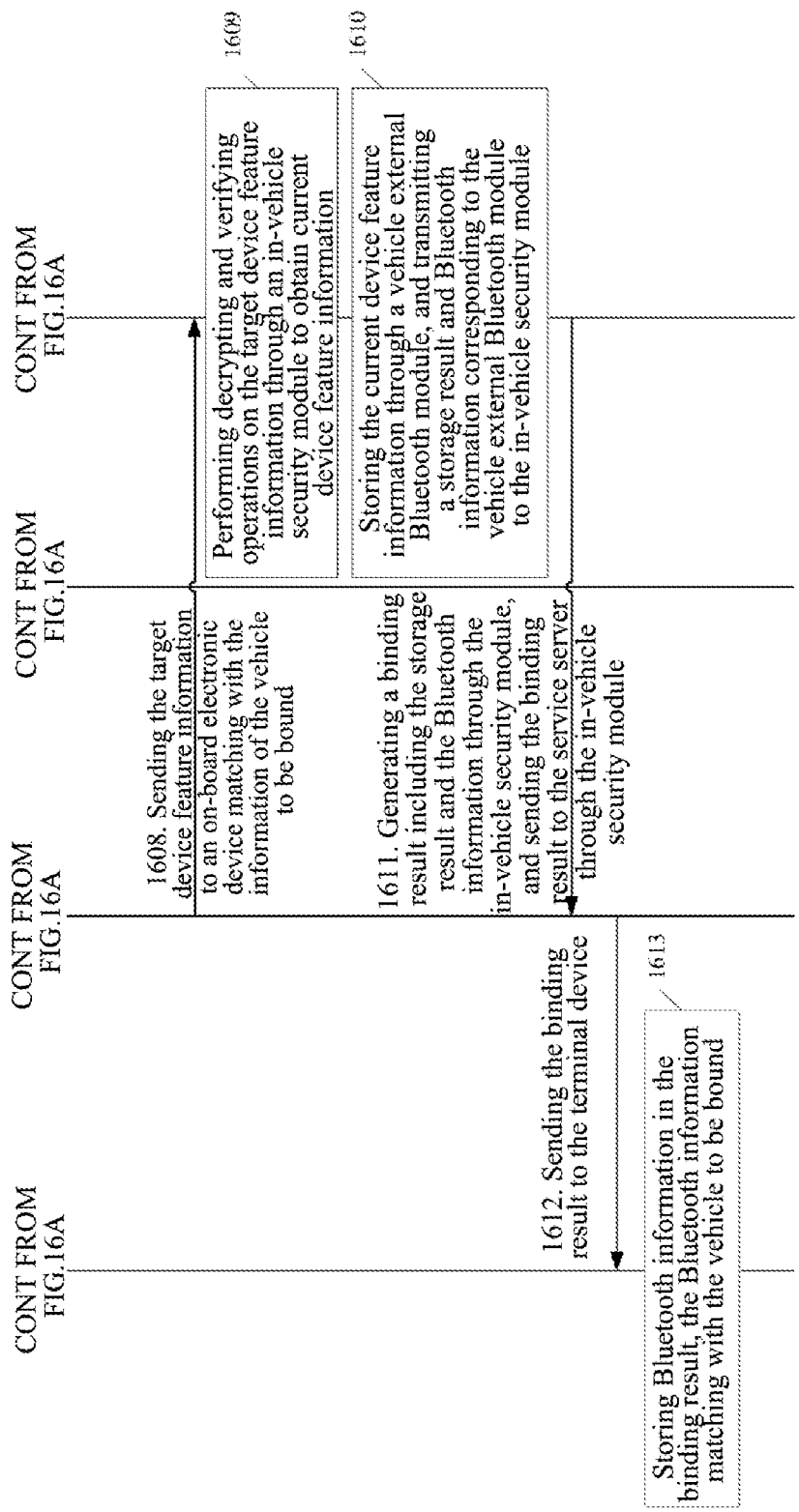
FIG. 16B is a flow diagram of another virtual key binding method disclosed by the embodiment in the present disclosure.

Please refer to FIG. 16A and FIG. 16B, and FIG. 16A and FIG. 16B are flow diagrams of another virtual key binding method disclosed by an embodiment in the present disclosure. As shown in FIG. 16A and FIG. 16B, the virtual key binding method may include the following steps:

1601. When an input binding instruction is detected, a terminal device extracts a device fingerprint of the terminal device and generates a service key;

1602. The terminal device generates the device feature information including the device fingerprint and the service key.

1603. The terminal device sends the device feature information to a service server.

1604 The service server associates and stores a device fingerprint and a service key included in device feature information, user account information of a terminal device, and information of a vehicle to be bound matching with the user account information.

1605. The service server sends the device feature information to the security server.

1606. The security server performs signing and encrypting operations on the device feature information, to obtain target device feature information.

1607. The security server sends the target device feature information to the service server.

1608. The service server sends the target device feature information to an on-board electronic device matching with the information of the vehicle to be bound.

1609. The on-board electronic device performs decrypting and verifying operations on the target device feature information through an in-vehicle security module to obtain current device feature information.

1610. The on-board electronic device stores the current device feature information through a vehicle external Bluetooth module, and transmits a storage result and Bluetooth information corresponding to the vehicle external Bluetooth module to the in-vehicle security module, where the Bluetooth information includes a Bluetooth address and a Bluetooth name of the vehicle external Bluetooth module.

1611. The on-board electronic device generates a binding result including the storage result and the Bluetooth information through the in-vehicle security module, and sends the binding result to the service server through the in-vehicle security module.

1612. The service server sends the binding result to the terminal device.

1613. The terminal device stores Bluetooth information in the binding result, the Bluetooth information matching with the vehicle to be bound.

It can be seen that implementations of the virtual key binding method described in FIG. 16 can send the device feature information generated according to the terminal device to the service server, so as to enable the service server to store the device feature information and send the device feature information to the security server, and so as to enable the security server to encrypt the device feature information and bind the encrypted device feature information to the on-board electronic device, and so as to enable data transmitted during a binding operation between the terminal device and the on-board electronic device to be encrypted data, avoiding divulging a secret due to data loss, thus improving security of transmitting data in a binding process between the terminal device and the on-board electronic device of the vehicle.

The embodiment of the present disclosure discloses a vehicle, which is provided with an on-board electronic device 1504.

The embodiment of the present disclosure also discloses a computer readable storage medium, where the computer readable storage medium stores program code, where the program code includes instructions for executing part or all of the steps of the methods in the method embodiments described above.

The embodiment of the present disclosure also discloses a computer program product, where, when the computer program product is running on a computer, the computer is enabled to perform part or all of the steps of the methods in the method embodiments described above.

The embodiment of the present disclosure also discloses an application publishing platform, where the application publishing platform is used to publish a computer program product, where, when the computer program product is running on a computer, the computer is enabled to perform part or all of the steps of the methods in the method embodiments described above.

It should be understood that references to "embodiment of the present disclosure" throughout the specification mean that a specific feature, a structure, or a feature related to the embodiment are included in at least one embodiment of the present disclosure. Therefore, "in the embodiment of the present disclosure" appearing throughout the specification may not necessarily refer to the same embodiment. In addition, the specific feature, the structure, or the feature may be combined in one or more embodiments in any suitable manner. Persons of ordinary in the art should also know that embodiments described in the specification are alternative embodiments, and actions and modules involved are not necessarily necessary for the present disclosure.

In various embodiments of the present disclosure, it should be understood that size of a serial number in each above-mentioned process does not means an inevitable sequence of execution, and executing sequence of each process shall be determined by its function and internal logic, and shall not constitute any restriction on implementing processes in the embodiments of the present disclosure.

In addition, the terms "system" and "network" are often used interchangeably herein. It should be understood that "B corresponding to A" means that B is associated with A, and B may be determined according to A. However, it should also be understood that determining B according to A does not mean that B is determined merely according to A, but B may also be determined according to A and/or other information.

Persons of ordinary in the art may understand that all or part of the steps in the various methods of the embodiments described above may be completed by instructing related hardware through a program, and the program may be stored in a computer readable storage medium, including read-only memory (ROM), random access memory (RAM), programmable read-only memory (PROM), erasable programmable read-only memory (EPROM), one-time programmable read-only memory (OTPROM), electrically-erasable programmable read-only memory (EEPROM), compact disc read-only memory (CD-ROM), or other optical disk storage, disk storage, tape storage, or any other medium that can be used to carry or store data.

The units described above as separation components may or may not be physically separated, and the components displayed as units may be or may not be physical units, which may be located in one place or distributed over multiple network units. Part or all of the units may be selected according to actual demand to achieve objectives of the present embodiment.

In addition, each functional unit in each embodiment of the present disclosure may be integrated into a processing unit, or each unit may physically exist, independently, or two or more units may be integrated in one unit. The above-mentioned integrated units may be implemented in a form of hardware, or in a form of a software functional unit.

When the integrated unit are implemented in the form of software functional unit and sold or used as an independent product, it may be stored in a computer accessible memory. Based on the understanding, technical solutions of the present disclosure in essence, or a part that contributes to the prior art, or all or part of the technical solutions, may be embodied in a form of a software product which is stored in a memory and includes a plurality of requests to enable a computer device (which may be a personal computer, a server, or a network, and specifically may be a processor in the computer device) to perform part or all of the steps in the above-mentioned methods of various embodiments in the present disclosure.

A virtual key binding method and system disclosed by the embodiments of the present disclosure are introduced above in detail. Specific examples are applied to explain principles and implementing manners of the present disclosure, and descriptions of the above embodiments are only used to help understand the methods and core idea of the present disclosure; meanwhile, for persons of ordinary in the art, according to the idea of the present disclosure, specific implementations and application scopes may be changed. In conclusion, contents of the specification should not be interpreted as a limitation of the present disclosure.

What is claimed is:

1. A virtual key binding method, wherein the method comprises:
   extracting, by a terminal device, a device fingerprint of the terminal device, and generating a service key, when an input virtual key binding instruction is detected;
   generating, by the terminal device, device feature information comprising the device fingerprint and the service key, the service key being used for enabling a security server to perform signing and encrypting operation on the device feature information;
   sending, by the terminal device, the device feature information to the service server, to enable the service server to store the device feature information in an on-board electronic device of a vehicle to be bound; and
   storing, by the terminal device, Bluetooth information in a virtual key binding result when it is detected that the virtual key binding result sent by the service server is a successful virtual key binding, the Bluetooth information matching with the vehicle to be bound.

2. The method according to claim 1, wherein the method further comprises:
   judging, by the terminal device, whether an unbound user type comprised in a virtual key unbinding instruction is a car owner type when an input virtual key unbinding instruction is detected;
   if so, identifying, by the terminal device, information of a vehicle to be unbound and unbound account information of an user to be unbound from the virtual key unbinding instruction;
   generating, by the terminal device, virtual key unbinding request comprising the information of the vehicle to be unbound and the unbound account information, and sending the virtual key unbinding request to the service server;
   outputting, by the terminal device, an unbound result when receiving the unbound result sent by the service server.

3. The method according to claim 1, wherein the extracting, by the terminal device, the device fingerprint of the terminal device, and generating the service key, when the input virtual key binding instruction is detected, comprises:
   extracting, by the terminal device, a plurality of device fingerprint feature values of the terminal device when the input virtual key binding instruction is detected; and
   generating, by the terminal device, the device fingerprint of the terminal device according to the plurality of device fingerprint feature values, and generating the service key which is a service public-private key pair or a service symmetric key.

4. The method according to claim 3, wherein the device fingerprint is generated according to extracted device feature values of the terminal device, and the device feature values are at least a device model, a serial number, and a hardware version of the terminal device.

5. The method according to claim 4, wherein fingerprint feature information of the terminal device needs to include all device fingerprint feature values obtained.

6. A terminal device, comprising:
   at least one processor; and
   a memory in communicational connection with the at least one processor; wherein,
   the memory stores instructions executable by the at least one processor, and the instructions are executed by the at least one processor to enable the at least one processor to execute the method according to claim 1.

7. The terminal device according to claim 6, wherein the at least one processor is further enabled to:
   extract a plurality of device fingerprint feature values of the terminal device when the input virtual key binding instruction is detected; and
   generate the device fingerprint of the terminal device according to the plurality of device fingerprint feature values, and to generate the service key which is a public-private key pair or a service symmetric key.

8. A virtual key binding method, wherein the method comprises:
- associating and storing, by a service server, a device fingerprint and a service key comprised in device feature information, user account information of a terminal device, and information of a vehicle to be bound matching with the user account information when receiving the device feature information sent by the terminal device, and sending the device feature information to a security server to enable the security server to perform signing and encrypting operation on the device feature information;
- sending, by the service server, target device feature information to an on-board electronic device matching with the information of the vehicle to be bound when signed and encrypted target device feature information fed back by the security server is detected, to enable the on-board electronic device to store the target device feature information; and
- sending, by the service server, a virtual key binding result to the terminal device when receiving the virtual key binding result sent by the on-board electronic device.

9. The method according to claim 8, wherein the method comprises: establishing, by the service server, data connection with the terminal device or the on-board electronic device in advance, so as to enable the terminal device and the on-board electronic device to send data to the service server at any time.

10. The method according to claim 8, wherein the method further comprises:
- identifying, by the service server, information of a vehicle to be unbound and virtual key unbinding account information comprised in a virtual key unbinding request when receiving the virtual key unbinding request sent by the terminal device;
- obtaining, by the service server, feature information of a device to be unbound matching the information of the vehicle to be unbound and the virtual key unbinding account information, and sending the feature information of the device to be unbound to the security server, so as to enable the security server to sign and encrypt the feature information of the device to be unbound, the feature information of the device to be unbound comprising a fingerprint of the device to be unbound and a service key;
- sending, by the service server, encrypted feature information of the device to be unbound to an on-board electronic device matching with the information of the vehicle to be unbound, so as to enable the on-board electronic device to delete bound information of the vehicle to be unbound when receiving the signed and encrypted feature information of the device to be unbound sent by the security server;
- sending, by the service server, an unbound result to the terminal device when receiving the unbound result sent by the on-board electronic device.

11. The method according to claim 8, wherein the sending, by the service server, the virtual key binding result to the terminal device when receiving the virtual key binding result sent by the on-board electronic device, comprises:
- judging, by the service server, whether a virtual key binding result is a successful virtual key binding result when receiving the virtual key binding result sent by the on-board electronic device;
- if so, obtaining, by the service server, Bluetooth information comprised in the virtual key binding result, the Bluetooth information comprising at least a Bluetooth address and a Bluetooth name;
- associating and storing, by the service server, the Bluetooth information with the user account information, the information of the vehicle to be bound, the device fingerprint and the service key comprised in the device feature information, and sending the virtual key binding result to the terminal device.

12. The method according to claim 8, wherein signed device feature information is obtained by performing digital signature on the device feature information through a preset private key when the device feature information sent by the service server is received; and
- the target device feature information is obtained by performing symmetric encrypting operation on the signed device feature information through a preset symmetric key.

13. The method according to claim 12, wherein the digital signature is performed by using an elliptic curve digital signature algorithm (ECDSA) or a RSA algorithm.

14. A service server, comprising:
- at least one processor; and
- a memory in communicational connection with the at least one processor; wherein,
- the memory stores instructions executable by the at least one processor, and the instructions are executed by the at least one processor to enable the at least one processor to execute the method according to claim 6.

15. The service server according to claim 14, wherein the at least one processor is further enabled to:
- judge whether the virtual key binding result is a successful virtual key binding result when the virtual key binding result sent by the on-board electronic device is received;
- obtain Bluetooth information comprised in the virtual key binding result when a judging result of the judging subunit is yes, the Bluetooth information comprising at least a Bluetooth address and a Bluetooth name; and
- associate and store the Bluetooth information with the user account information, the information of the vehicle to be bound, and the device fingerprint and service key comprised in the device feature information, and to send the virtual key binding result to the terminal device.

* * * * *